United States Patent

[11] 3,633,623

[72] Inventors Leo F. Perry;
Gale N. Puerner, both of Fort Atkinson, Wis.
[21] Appl. No. 31,505
[22] Filed Apr. 24, 1970
[45] Patented Jan. 11, 1972
[73] Assignee AquaMatic, Inc.
Rockford, Ill.

[54] MOTOR-OPERATED VALVE
20 Claims, 6 Drawing Figs.
[52] U.S. Cl............................................. 137/625.46
[51] Int. Cl............................................. F16k 11/06
[50] Field of Search.................................. 137/625.46; 74/125.5; 251/248

[56] References Cited
UNITED STATES PATENTS

| 3,105,518 | 10/1963 | Kunz | 137/625.46 X |
|---|---|---|---|
| 2,051,155 | 8/1936 | Staegemann | 137/625.46 X |
| 1,873,633 | 8/1932 | Pitter | 74/125.5 |
| 2,253,842 | 8/1941 | Brotman | 74/125.5 X |
| 2,327,980 | 8/1943 | Bryant | 251/248 X |
| 2,582,333 | 1/1952 | Horodeck | 137/625.46 |
| 2,611,392 | 9/1952 | Johnson | 137/625.46 |
| 2,804,778 | 9/1957 | Booth | 74/125.5 |
| 3,098,398 | 7/1963 | Ryan | 74/125.5 X |
| 3,110,254 | 11/1963 | Davis | 74/125.5 X |
| 3,114,393 | 12/1963 | Vlasic | 137/625.46 X |

Primary Examiner—Samuel Scott
Attorney—McCanna, Morsbach, Pillote & Muir

ABSTRACT: The valve is of the lift-turn type and includes a ported stator, and a ported rotor cooperable with the stator to control the flow of fluid through the valve. A stem is attached to the rotor and extends outwardly of the valve casing. A gear and a cam are fixed to the stem outwardly of the valve casing. The motor continuously drives both a shaft and another gear during the time the motor is operated. The shaft, operating through a clutch mechanism, drives an arm to lift the stem. This unseats the rotor and causes the gears to mesh for rotation of the rotor by the motor. Meanwhile, the clutch slips but holds the stem in lifted position. The cam operates to throw a switch and cease power to the motor when the rotor has reached a preselected position. This ceases rotation of the rotor and stops the shaft. A spring then urges the stem and rotor back to seated position.

PATENTED JAN 11 1972

Inventors
Leo F. Perry
Gale N. Puehner
By
McCanna, Morsbach, Pillote & Muir
Attorneys

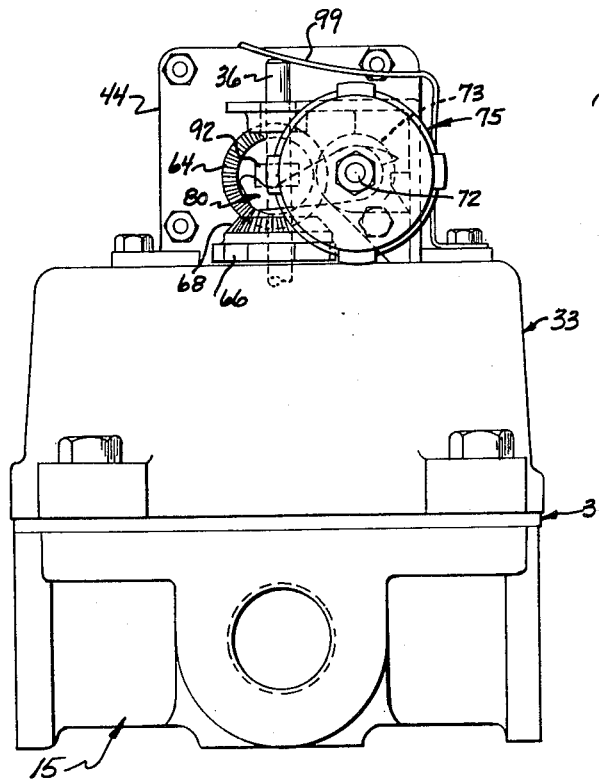
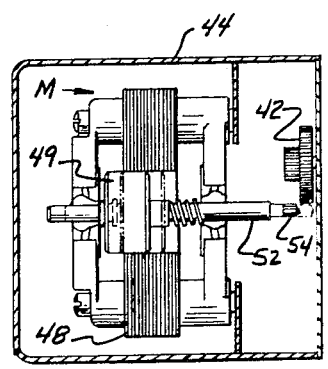
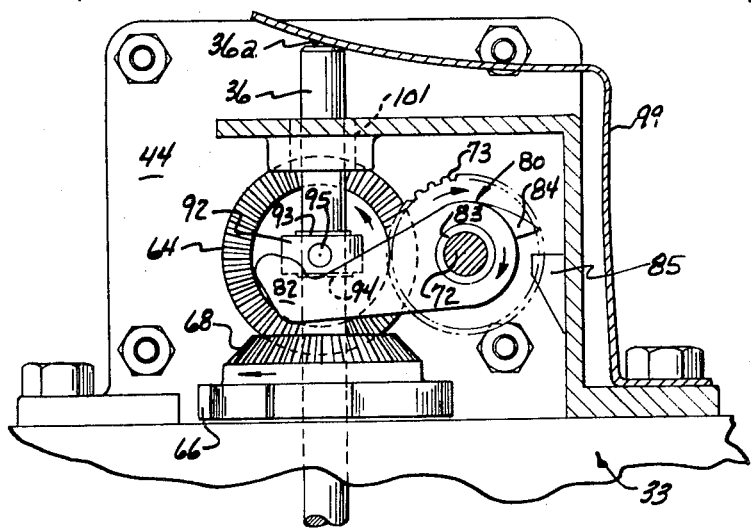

MOTOR-OPERATED VALVE

BACKGROUND

The invention pertains generally to fluid handling and more particularly to a motor-operated valve of the lift-turn type.

Valves of the lift-turn type have been eminently successful for a considerable period of time. Attempts have been made to provide valves of the lift-turn type with a motor-operated drive. Some examples are as follows: U.S. Pat. No. 2,235,287, issued March 18, 1941 to Daniels; U.S. Pat. No. 2,363,167, issued Nov. 21, 1944 to Daniels; and U.S. Pat. No. 2,871,883, issued Feb. 3, 1959 to Dunlap. In general, these prior motor-operated valves of the lift-turn type have been relatively complex mechanisms and thus relatively expensive.

SUMMARY

The present invention relates to new and useful improvements in valves, and more particularly to a motor-operated valve of the lift-turn type.

An important object of this invention is the provision of a multiport valve of the lift-turn type with an improved motor-operated drive therefor.

Another object is to provide a motor-operated valve of the lift-turn type which is of simplified construction and which is reliable in operation.

It is another object of the present invention to provide a motor-operated valve of the lift-turn type having a stator and a rotor, and unique means operated by the motor for lifting the rotor prior to its rotation to a succeeding position.

Another object of the present invention is to provide apparatus in accordance with the foregoing object which includes a clutch or torque limiting means which moves the rotor to its lifted position and continuously applies torque to hold the rotor in lifted position.

Yet another object of the present invention is to provide a motor-operated valve of the lift-turn type including a gear continuously driven by the motor during the time the motor is operated, a second gear mounted on the stem of the valve and means for meshing said gears for rotating the rotor after the rotor has been unseated.

Other objects of the present invention are to provide a motor-operated valve of the lift-turn type having multiple positions and timing means for timing the interval that the rotor is at each position; circuit means including a switch operated by a cam to deenergize the motor when the rotor reaches a preselected turn position; drive means which includes a cantilevered arm movable through a preselected arc and mounted on a shaft which is continuously rotated during the time the motor is driven; or a rotor clutch operative to disengage the motor from gear means when the motor is stopped.

These, together with other objects and advantages of the present invention, will become apparent as the same becomes better understood from the following detailed description when taken together with the drawings.

DRAWINGS

FIG. 3 is a side elevational view as seen from the right of FIG. 1;

FIG. 4 is a cross-sectional view through the drive mechanism taken along line 4—4 of FIG. 2 and on a larger scale than the preceding views;

FIG. 5 is a diagrammatic view of a preferred embodiment of the drive motor having a rotor clutch and showing the moved positions of the rotor.

DESCRIPTION

Figure 1:
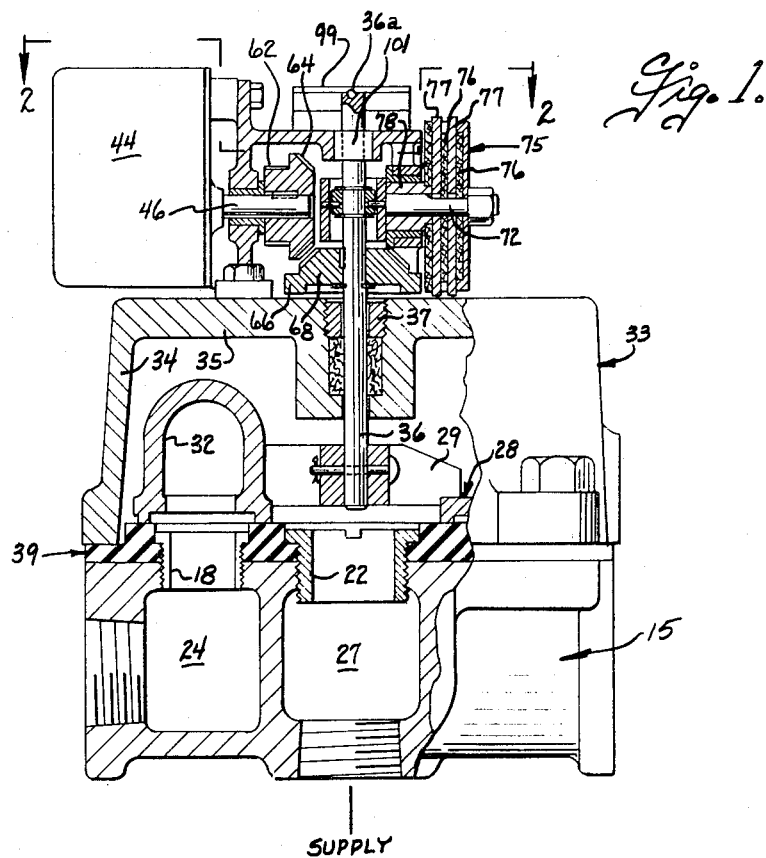
FIG. 1 is a partial sectional view of a preferred embodiment of the present invention and taken generally along line 1—1 of FIG. 2.

Reference is now made more particularly to the drawings which illustrate the best presently known mode of carrying out the invention and wherein similar reference characters indicate the same parts throughout the several views.

The motor-operated valve of the present invention is adapted for a multiplicity of uses. The valve, as herein shown and described, has a specific port and passage arrangement which is particularly adapted for use with a water softener. The specific valve shown is by way of illustration only, and it should be understood that various other port and passage arrangements may be provided as required by the particular use which is made of the valve.

Referring to FIG. 1, the valve comprises a stator body 15 of any suitable configuration, and having a plurality of angularly spaced ports such as shown at 18 and 22. These ports extend through the face of the stator and communicate with passages such as shown at 24 and 27. The valve may conveniently be of the type wherein the central passage 27 is arranged for communication with the raw water supply line. A rotor 28 having a central spider which overlies the central port 22 is provided to control the flows through the several ports in the stator. The rotor illustrated has a port (not shown) for passing raw water which enters through the central port in the stator and an arcuate flow passage 32 arranged to communicate several of the annularly spaced ports in the stator with each other. A cover or bonnet 33 having an annular sidewall 34 and a top wall 35 is attached to the stator to form a fluid chamber therewith. A stem 36 is attached to the rotor 28 and slidably and rotatably extends through a gland 37 in the top wall of the cover for lifting, turning and reseating the rotor on the stator. A resilient member 39 having ports corresponding to the ports in the stator 15 is positioned on the face of the stator and cooperates with the rotor 28 for reseating the rotor in a sealed relationship at its successive positions. The valve thus far described is identical to the valve shown and described in the aforementioned U.S. Pat. No. 2,871,883, issued Feb. 3, 1959, and reference is made thereto for a more complete description of the valve apparatus and its functions.

Figure 2:
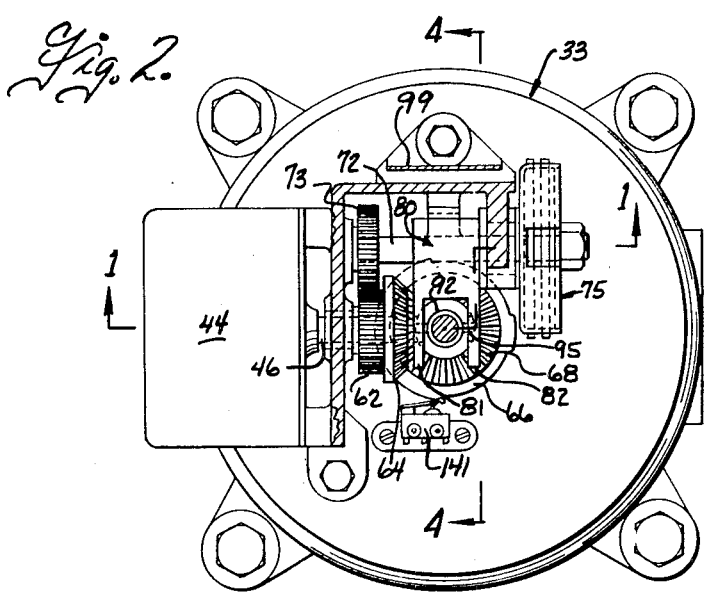
FIG. 2 is a partial sectional view taken along line 2—2 of FIG. 1.

In accordance with the present invention, the valve is arranged for motor operation between its successive positions. Motor M and a suitable gear reducer, one portion of which is shown at 42 in FIG. 5, are conveniently enclosed in a housing 44. Power from the motor is transferred to a shaft 46 extending out of the housing (see FIGS. 1 and 2). The motor is advantageously a two-pole shaded pole alternating-current motor, conveniently operable on household current. In the embodiment illustrated, shaft 46 has an output speed of 1 r.p.m. As shown in FIG. 5, the motor M has a stator 48 and a rotor 49. The rotor 49 is connected to a shaft 52 which terminates in a pinion 54. As shown in the phantom lines of FIG. 5, the rotor 49 and shaft 52 are movable axially to provide a rotor clutch which disengages the pinion 54 from the gear reducer 42 when power to the motor is ceased. The purpose of this arrangement will be hereafter explained. One suitable motor is Model HGM manufactured by Molon Motor and Coil Corporation of Rolling Meadows, Illinois.

Mounted on drive shaft 46 is a combination gear which includes a spur gear portion 62 and a beveled gear portion 64. These gears may be separate gears and may be otherwise arranged; however, in the present embodiment, these gears are advantageously continuously driven during the time that the motor M is operated. Mounted on stem 36 is another combination element—this time having a cam portion 66 and a beveled gear portion 68. When the stem is lifted, as hereinafter explained, beveled gear 68 meshes with beveled gear 64 and thereby rotates the stem 36 and rotor 28 to a succeeding position.

The means for lifting the stem will now be described. In the embodiment illustrated, a shaft 72 is rotatably mounted generally parallel to drive shaft 46 and disposed rearwardly of the stem 36. A spur gear 73 is secured to shaft 72 for rotation therewith and is in mesh with spur gear 62 so that the shaft 72 and gear 73 are continuously rotated during the time the motor is operated. At the outer end of shaft 72 is mounted an apparatus for transmitting torque from the shaft 72. While it is contemplated that other apparatus for transmitting torque may be used, the apparatus is in the form of a friction clutch mechanism generally designated 75. As best seen in FIG. 1, clutch 75 is in the form of a multiple-disc clutch which includes a plurality of discs alternately splined to the driving and driven members. As shown, a plurality of discs 76 are mounted for rotation with shaft 72 and a plurality of other discs 77 are arranged to drive a cylindrical member 78 which, in turn, is secured to a cantilevered arm, generally designated 80. Arm 80 is conveniently bifurcated and has portions 81 and 82 disposed on opposite sides of stem 36. The arm 80 is advantageously rotatably mounted on shaft 72 as by a bushing 83. Thus, shaft 72 and arm 80 can rotate independently of each other. A rearwardly projecting finger 84 is located on the arm 80, as best seen in FIG. 4. Finger 84 can engage a stop 85 positioned on the casting.

A collar 92 is mounted circumjacent the stem 36 and is so arranged that the stem can rotate when the collar is held in a stationary position. The collar 92 is held in vertical position on the stem by means of split rings 93 and 94 (see FIG. 4). Pins 95 extend laterally from the collar 92 to a position overlying the bifurcated ends 81 and 82 of the arm 80. As best seen in FIG. 4, the upper surface of the bifurcated ends 81, 82 are grooved to receive the pins 95.

In operation, when the motor is energized, gears 62 and 64 are continuously rotated as in shaft 72. The continuous rotation of shaft 72, operating through clutch 75, causes the arm 80 to rotate in the direction of the arrow shown in FIG. 4. The bifurcated ends 81, 82 of the arm engage the pins 95 and raise the stem 36 until the finger 84 engages to stop 85. Raising the stem 36 unseats the rotor 28 from the stator 15. The raising of the stem 36 also meshes bevel gears 64 and 68. Gear 68 is then driven by the continuously rotated gear 64. This rotates the rotor to the next succeeding position at which time power to the motor is terminated.

When power to the motor is terminated, spring means, conveniently in the form of a leaf spring 99 resiliently urges the stem, and hence the rotor, downwardly to reseat the rotor. As best seen in FIG. 4, stem 36 has a ball bearing 36a at its upper end for engagement by the spring 99. In this manner, when the stem is raised the leaf spring can move longitudinally of the ball bearing 36a. In the embodiment illustrated, the leaf spring applies a pressure of about 10 pounds to reseat the rotor.

As previously indicated, the motor M has a rotor clutch which disengages the pinion 54 from the gear reducer when power to the motor is terminated. This allows the gear reducer and the various elements to back up when the stem is lowered. More particularly, when the spring 99 resiliently urges the stem to its lower position, the arm 80 is rotated in a direction opposite the arrow shown in FIG. 4. The force thus applied, operating through the clutch 75 also rotates the shaft 72 and spur gear 73 in the opposite direction. These, operating through spur gear 62 also reverses the gear reducer. By disengaging the motor from the gear reducer, this reverse rotation operation can be performed. To assure that the rotor 28 and the cam 66 are not backed up by this operation, a nonrotation limiting device 101 is advantageously located circumjacent stem 36 (see FIG. 4). A suitable device 101 is a nonreversing needle bearing assembly or a one-way clutch bearing. Alternatively, device 101 can be located adjacent gland 37 (see FIG. 1).

Figure 6:
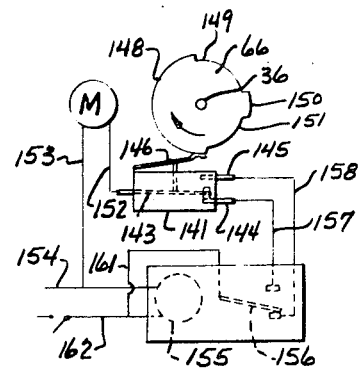
FIG. 6, on sheet 1 of the drawings, is a diagrammatic view illustrating the electrical controls for the system.

Referring now to FIG. 6, the means for starting and stopping the motor M will be described. As indicated above, the rotative position of the rotor 28 is controlled by ceasing power to the motor M and allowing the rotor 28 to be reseated. The control system includes a three-way switch 141 which senses the rotative position of the rotor 28 by sensing the rotative position of cam 66. Switch 141 is conveniently mounted in the position illustrated in FIG. 2. The switch 141 includes an arm or leaf 143 which is movable alternately into engagement with contacts 144 and 145. An actuator 146 is provided for moving the arm 143, and the actuator engages cam lobes conveniently formed on the cam 66. It will be remembered that cam 66 is secured to stem 36 for movement therewith. The cam is movable in the direction indicated by the arrow in FIG. 6 and includes alternate lobes and wells 148, 149, 150 and 151. The shape and length of the respective lobes and wells determines the distance through which the stem is rotated during subsequent actuations of the motor M and may vary somewhat for valves having different operational sequences. The arm 143 of the switch 141 is connected in a series circuit including conductor 152, Motor M and conductor 153 to one of the power supply conductors 154. A timer mechanism, including a timer drive motor 155 and a switching mechanism, diagrammatically indicated at 156, is provided for alternately supplying power to conductors 157 and 158 connected to the contacts 144 and 145, at time intervals corresponding to the successive phases of the regeneration cycle. The switching mechanism 156 is diagrammatically shown as a three-way switch which completes a circuit through conductor 161 to the other supply conductor 162. It is to be understood, however, that any other suitable switching and cam arrangement may be provided to accomplish the aforementioned function, namely, energization of conductors 157 and 158 alternately at time intervals corresponding to the successive phases of the regeneration cycle.

As one example of the operation of the aforedescribed apparatus when embodied in a water treatment system, a complete operation will be described. When it is time to regenerate the softener (not shown), the timer operates the switch mechanism 156 to apply power to the conductor 157 and complete a circuit to the motor M by way of contact 144 and arm 143. The arm 143 maintains the circuit to the motor M until the cam has rotated through substantially 180° to rotate the rotor 28 to its next succeeding position, i.e., the backwash position. While the rotation is shown at 180°, other angular movements may be used, depending on the port arrangement. It will be remembered that the motor M, operating through arm 80 first raises the rotor prior to rotating the same, as described above. After the rotation through the requisite angle, the actuator 146 drops off the cam lobe 148 and into the cam well 149 to thereby move the arm 143 out of engagement with the contact 144 and into engagement with the contact 145. This stops the motor M and allows the spring 99 to reseat the rotor 28.

After a suitable time interval, the timer operates the switch mechanism 156 to apply power to the conductor 158. This completes the circuit to the motor M through contact 145 and arm 143 of the valve switch. The rotor 28 is then rotated to its regeneration position. When the rotor reaches its regeneration position, the cam lobe 150 operates the actuator 146 in the manner previously described to stop the motor M.

After a time interval corresponding to the duration of the regeneration and slow rinse phases of the regeneration cycle, the timer motor again operates the switch mechanism 156 to again apply power to the conductor 157. This establishes a circuit to the motor M to again lift and turn the rotor to its rapid rinse position at which time the actuator 146 drops off the cam lobe 150.

At the end of the rapid rinse phase, the timer operates the switch 156 and again applies power to the conductor 158, completing a circuit to the motor M through contact 145 and arm 143. The rotor is again lifted, and rotated until the cam lobe 148 again moves the arm 143 away from contact 145 and the rotor is reseated at service position. The motor M is stopped until the timer mechanism again supplies power to conductor 158 at the beginning of a subsequent regeneration cycle.

To reduce the fore necessary to lift the rotor 28, means can be provided for equalizing the pressures above and below the rotor prior to lifting. The pressures can be advantageously equalized by providing an auxiliary valve which functions in a lost-motion connection between the stem 36 and the rotor 28. One suitable arrangement is shown and described in U.S. Pat. No. 2,822,000 issued Feb. 4, 1968 to Daniels.

From the foregoing it is felt that the structure and operation of the motor-operated valve is understood. In particular, it is felt that there has been described a new and useful motor-operated valve in which a gear 64 and shaft 72 are continuously rotated during the time the motor M is operated. Shaft 72, operating through clutch 75 rotates arm 80 to lift the stem 36. Gear 68, fixed to stem 36, then meshes with gear 64 to be driven thereby and thus rotate the rotor to its succeeding position. In this manner, the continuously driven motor operates to first lift and then turn the stem 36 and rotor 28.

While a preferred embodiment of the invention has herein been illustrated and described, this had been done by way of illustration and not limitation, and the invention should not be limited except as required by the scope of the appended claims.

The embodiments of the invention in which an exclusive property or privilege is claimed are defined as follows:

1. In a motor-operated valve including a motor, a ported stator, a cover attached to the stator and forming a fluid chamber therewith, a ported rotor in the chamber and cooperable with the stator to control the flow of fluid through the valve, a stem attached to the rotor and extending through the cover for slidable and rotatable movement relative thereto, a first gear fixed to the stem outwardly of the cover, and means for applying a yieldable pressure on the rotor for urging the rotor into seating engagement with the stator; the improvement comprising: drive means including a second gear and a shaft both continuously rotated by the motor during the time the motor is operated; means for lifting the stem to a lifted position in response to rotation of the shaft and for engaging the gears to cause rotation of the rotor; and a clutch interposed between the means for lifting the stem and the shaft for transmitting torque from the shaft to move the stem to its lifted position and to continuously apply torque to hold the stem in lifted position with the gears engaged; whereby when the stem is lifted, the rotor is unseated and the gears engaged for rotating the rotor.

2. A motor-operated valve as set forth in claim 1 wherein the means for lifting the stem includes a movable arm selectively movable to a position in which the stem is at its lifted position and the rotor is unseated, and means for rotatably mounting the arm on the shaft, whereby the shaft supports the arm but the rotation of the shaft continues after the arm reaches the aforementioned position.

3. The combination of claim 1 including a cam mounted for rotation with the stem outwardly of the chamber; and circuit means including a switch operated by the cam when the cam and rotor have reached a preselected position to deenergize the motor; thereby stopping the application of torque through the clutch and allowing the rotor to be reseated.

4. The combination of claim 3 including timing means for energizing the motor at a preselected interval after the rotor has been reseated at at least one position thereby controlling the time the rotor is at said one position.

5. The combination of claim 4 wherein the valve is a multiport valve, the rotor is movable to a plurality of positions for controlling a plurality of flows through the valve, and the timing means is operative for timing the interval that the rotor is at each position.

6. A motor-operated valve as set forth in claim 1 wherein the drive means includes a gear reducer between the second gear and the motor, and a second clutch operative to disengage the motor from the gear reducer when the motor is stopped.

7. A motor-operated valve as set forth in claim 6 wherein the second clutch is a rotor clutch.

8. In a motor-operated valve having two multiple port members, one being a movable member, a stem extending from the movable member for unseating, rotating, and reseating the same, a first gear fixed to the stem for rotation therewith, resilient means acting on the stem for exerting pressure on the movable member to hold the same seated, an electric motor, and drive means driven by the motor for unseating and rotating the movable member; characterized in that the drive means includes: a second gear continuously driven by the motor during the time the motor is operated and spaced from the first gear when the movable member is seated, a shaft continuously driven by the motor during the time the motor is operated, an arm for engaging the stem to move the stem against the resilient means for unseating the movable member and for meshing said gears for rotating the movable member, and torque limiting means operatively connected to the shaft and to the arm for transmitting torque from the continuously driven shaft to the arm to move the arm a preselected limited amount; and including a circuit for energizing the electric motor, and a switch responsive to the rotative position of the movable member for breaking the circuit and stopping the electric motor when the movable member is at a preselected position thereby reseating the movable member.

9. The combination of claim 8 wherein the arm is rotatably mounted on the shaft so that the shaft supports the arm for independent rotation.

10. The combination of claim 8 including a cam mounted on the stem for rotation therewith and for operating the switch to break the circuit.

11. The combination of claim 10 including timing means associated with the circuit means for completing the circuit and starting the motor at a preselected time.

12. In a motor-operated valve including an electric motor, a ported stator, a cover attached to the stator and forming a fluid chamber therewith, a ported rotor movable to different positions in the chamber and cooperable with the stator to control the flow of fluid through the valve, resilient gasket means between the rotor and stator, a stem attached to the rotor and extending through the cover for slidable and rotative movement relative thereto, spring means acting on the stem to exert pressure on the rotor to hold the same seated, and drive means driven by the motor for unseating and rotating the rotor; characterized in that the drive means includes: a shaft spaced from the stem and continuously rotated by the motor during the time the motor is operated; an arm rotatable through an arc and engageable with the stem to move the stem to a moved position against the pressure of the spring means and thereby unseating the rotor; and a clutch interposed between the shaft and arm for transferring torque from the shaft to the arm to move the stem to its moved position and to continue to hold the stem thereat during the time the motor is operated; and including a circuit for energizing the motor; and a switch responsive to the rotative position of the rotor for breaking the circuit and stopping the motor when the rotor is at a preselected position and thereby permitting the spring means to reseat the rotor.

13. The combination of claim 12 wherein the arm is rotatably mounted on the shaft and cantilevered therefrom to engage the stem, whereby the shaft supports the arm for independent rotation.

14. A motor-operated valve as set forth in claim 12 wherein the drive means also includes gear-reducing means between the motor and the shaft, and a second clutch operative to disengage the motor from the gear-reducing means when the motor is stopped, whereby when the motor is stopped the gear-reducing means and the shaft are rotated in a reverse direction by the movement of the arm when the rotor is reseated without rotating the motor in the reverse direction.

15. A motor-operated valve according to claim 14 including a nonrotation limiting device circumjacent the stem to prevent reversal of the rotor when the gear-reducing means and the shaft are rotated in the reverse direction.

16. A motor-operated valve as set forth in claim 14 including a first gear fixed to the stem outwardly of the cover and movable therewith to the stem's moved position; and wherein the drive means includes a second gear continuously rotated by the motor during the time the motor is operated and so positioned that said gears are engaged when the stem is in its moved position thereby rotating the rotor.

17. A motor-operated valve as set forth in claim 16 including a third gear mounted on the shaft for rotation therewith and engaged with the second gear to be driven thereby, whereby the second gear continuously drives the shaft during the time the motor is operated but drives the first gear for only a portion of that time.

18. A motor-operated valve as set forth in claim 16 including a cam fixed to the stem outwardly of the cover for throwing the switch when the rotor reaches a preselected position, and timing means for completing the circuit at preselected times thereby controlling the time the rotor is seated at each position.

19. In a motor-operated valve including a casing; a stem slidably extending through the casing between raised and lowered positions; the stem being rotatable when raised to move to succeeding positions; spring means yieldably urging the stem to its lowered position; a motor; means operatively connected to the motor to move the stem to its raised position against the force of the spring means when the motor is operated and including a clutch arranged to slip when the stem is raised, and an arm rotated by the clutch; a stop supported on the casing for engaging the arm to limit its rotation at the raised position of the stem; a first gear driven by the motor; a second gear meshed with the first gear when the stem is raised for rotating the stem only after it is raised; circuit means including a switch for controlling energization of the motor; and a cam responsive to the position of the stem for throwing the switch and breaking the circuit when the stem has been rotated to a succeeding position thereby stopping the motor and allowing the spring means to lower the stem.

20. A motor-operated valve according to claim 19 wherein the stem has one end disposed outwardly of the casing, and the spring means is a leaf spring overlying said one end of the stem; and including a ball bearing at said one end of the stem against which the leaf spring bears so arranged that the leaf spring moves along the ball bearing as the stem is raised and lowered.

* * * * *